United States Patent Office 3,499,636
Patented Mar. 10, 1970

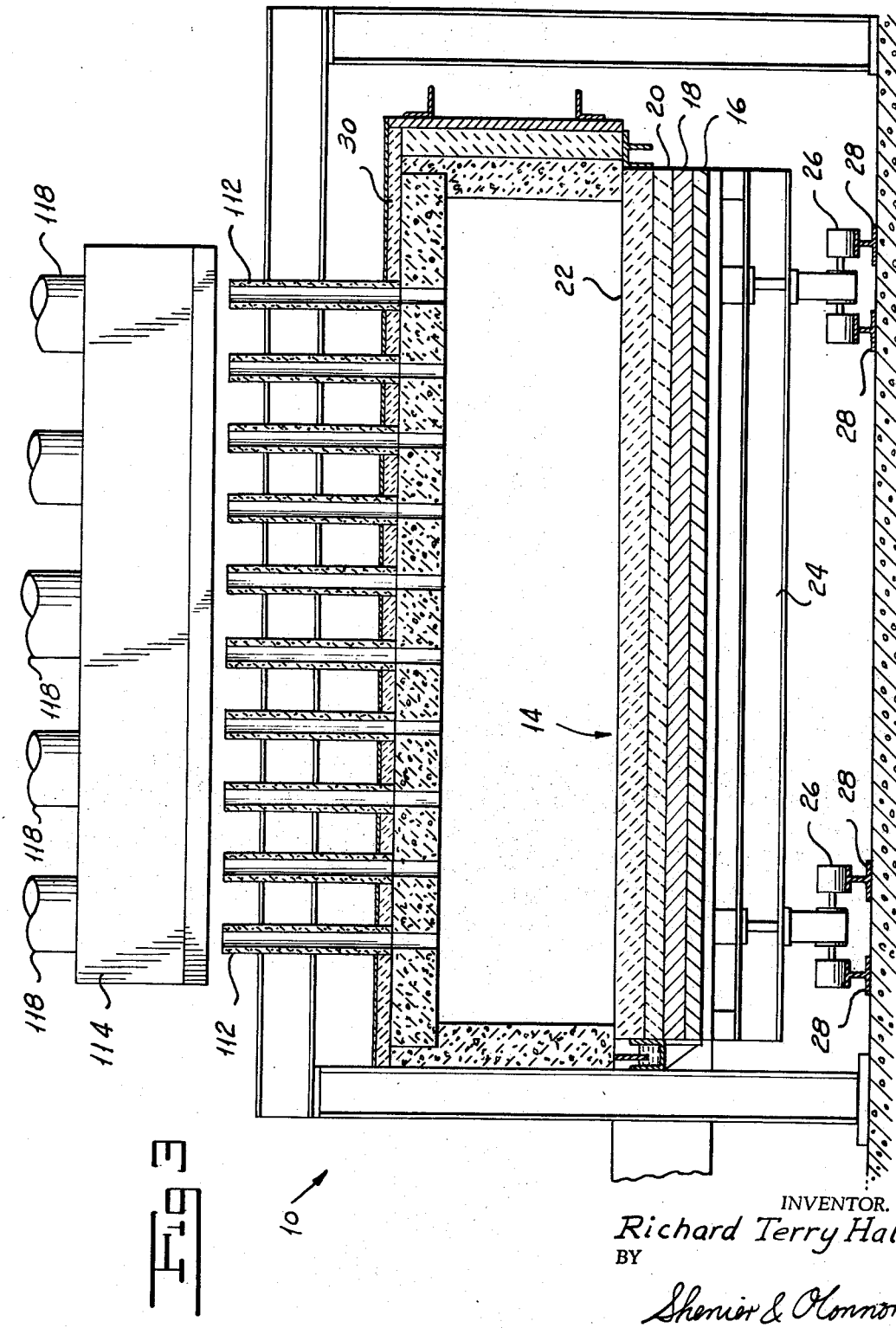

3,499,636
METHOD OF AND APPARATUS FOR PRODUCING LOW SULFUR LIME
Richard Terry Hall, Islington, Ontario, Canada, assignor to International Processes Limited, Nassau, Bahamas, a corporation of the Bahama Islands
Filed Apr. 5, 1968, Ser. No. 719,131
Int. Cl. C04b 1/00, 3/00; F27b 9/00
U.S. Cl. 263—28                                        11 Claims

ABSTRACT OF THE DISCLOSURE

A process of and apparatus for calcining limestone to produce lime having an extremely low sulfur content in which sulfur gases generated during the terminal portion of the calcining process as sulfates break down and are positively and continuously removed from the hearth at a location just ahead of the kiln lime discharge while keeping oxygen away from the discharge area.

BACKGROUND OF THE INVENTION

Lime or calcium oxide is an important additive used in the basic oxygen furnace method of producing steel to remove sulfur gases generated in the course of the process. It is necessary in order that the lime efficiently accomplish its purpose that the lime used in the process have a very low sulfur content.

In the process of calcining limestone to produce lime, the stone, which is essentially calcium carbonate, is subjected to heat to produce lime and exhaust gases. All limestone, however, has some sulfur content. In one process of calcining limestone known in the prior art, preheated stone is fed to a rotary hearth which carries the limestone through various heating zones whereat the temperature of the limestone is raised sufficiently to cause the carbonates to break down. Upon completion of the process, the lime is removed from the rotary hearth. Exhaust gases produced during the calcining operation are used to preheat the stone being fed to the hearth. In this process of the prior art, as the material reaches the location at which the stone is being removed, the temperature of the material has been raised to above about 2000° F. at which temperature the sulfates break down to produce sulfur gases.

I have discovered that if these sulfur gases are drawn back through the system with other exhaust gases, they recombine with the lime so as to result in lime having an undesirably high sulfur content. I have also discovered that this recombination is accelerated in the presence of free oxygen.

I have invented a method of producing lime which overcomes the defects of calcining methods of the prior art. My method results in the production of lime having an extremely low sulfur content. I prevent sulfur gases generated during the calcining process from recombining with the lime.

SUMMARY OF THE INVENTION

One object of my invention is to provide a method of calcining lime which overcomes the defects of calcining methods of the prior art.

Another object of my invention is to provide a method of producing lime having an extremely low sulfur content.

A further object of my invention is to provide a method for producing lime which is especially adapted for use in the basic oxygen furnace process.

A still further object of my invention is to provide a method of calcining lime in which sulfur gases generated during the calcining process are prevented from recombining with the lime.

Yet another object of my invention is to provide apparatus for calcining limestone to produce lime having a very low sulfur content.

Other and further objects of my invention will appear from the following description.

In general my invention contemplates the provision of a method of calcining limestone in which the stone is fed to a rotary hearth which carries the stone through zones in which the stone is heated to a temperature to decompose the stone and to a discharge location at which the lime is removed from the hearth. I provide means for removing sulfur gases adjacent the lime discharge point to prevent these gases from being recirculated through the system. I may employ the removed gases to preheat stone in a region wherein they cannot cause contamination.

BRIEF DESCRIPTION OF THE DRAWINGS

In the accompanying drawings which form part of the instant specification and which are to be read in conjunction therewith and in which like reference numerals are used to indicate like parts in the various views:

FIGURE 3 is a sectional view of my apparatus for calcining limestone taken along the line 3—3 of FIGURE 2.

DESCRIPTION OF THE PREFERRED EMBODIMENT

Figure 1:
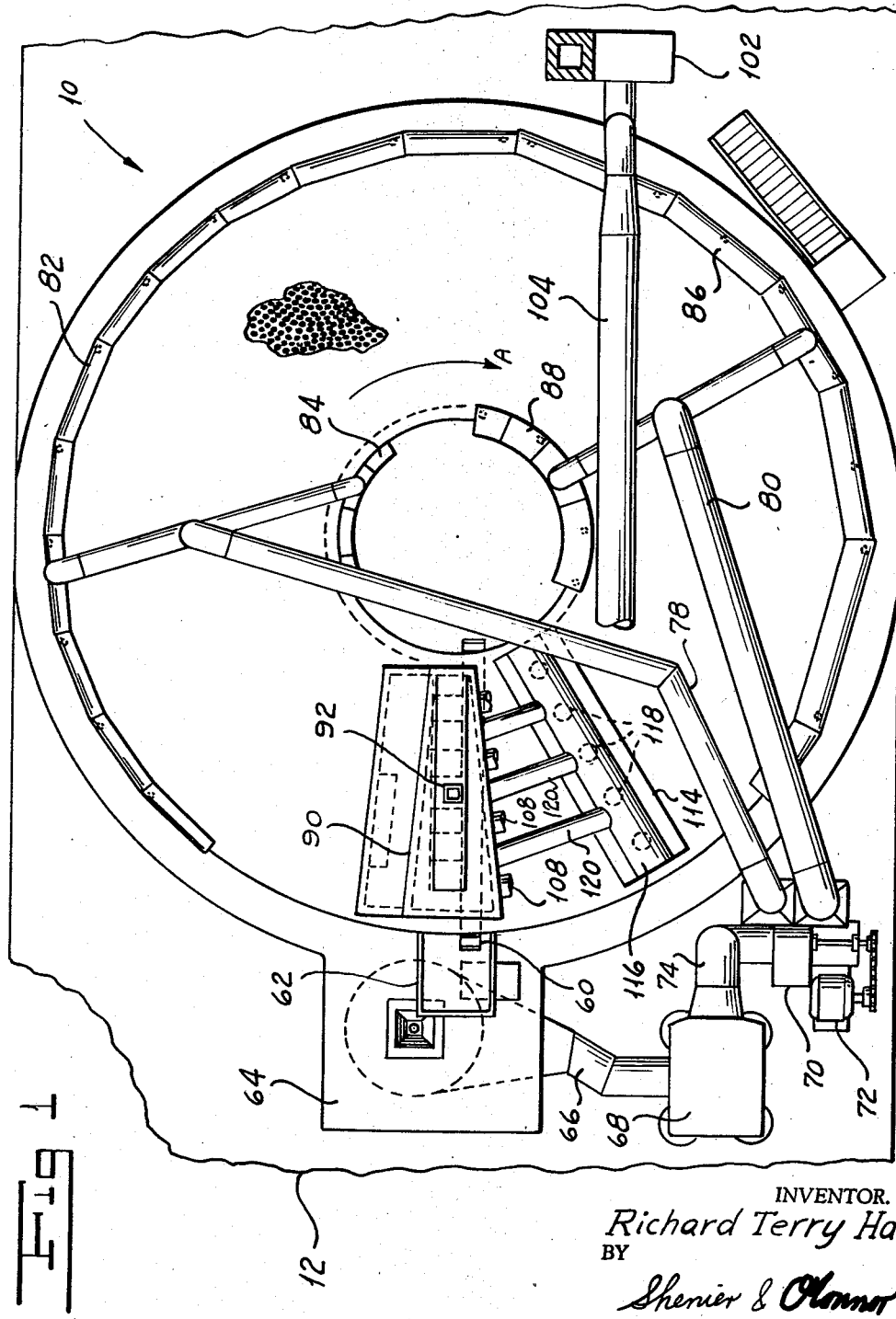
FIGURE 1 is a top plan view of my apparatus for calcining limestone, with parts broken away.

Referring now to the drawings, my apparatus for calcining limestone includes rotary calcining apparatus indicated generally by the reference character 10 which is supported on a floor 12. The hearth 10 includes the hearth proper, indicated generally by the reference character 14, which is generally circular in shape and which includes two steel plates 16 and 18 on which I place two plates 20 and 22 of refractory material. I provide a frame 24 for supporting the superposed plates 16, 18, 20 and 22. A plurality of rollers 26 on the frame 24 rest on rails or tracks 28 on which the hearth travels in the direction of the arrow A in FIGURE 1. Owing to the fact that this hearth structure and the drive means therefor are known in the art, they will not be described in detail. I proved the hearth assembly 10 with a cover 30 in which I place burners (not shown) at spaced locations therearound to heat limestone as it is carried by the hearth through various zones.

Figure 2:
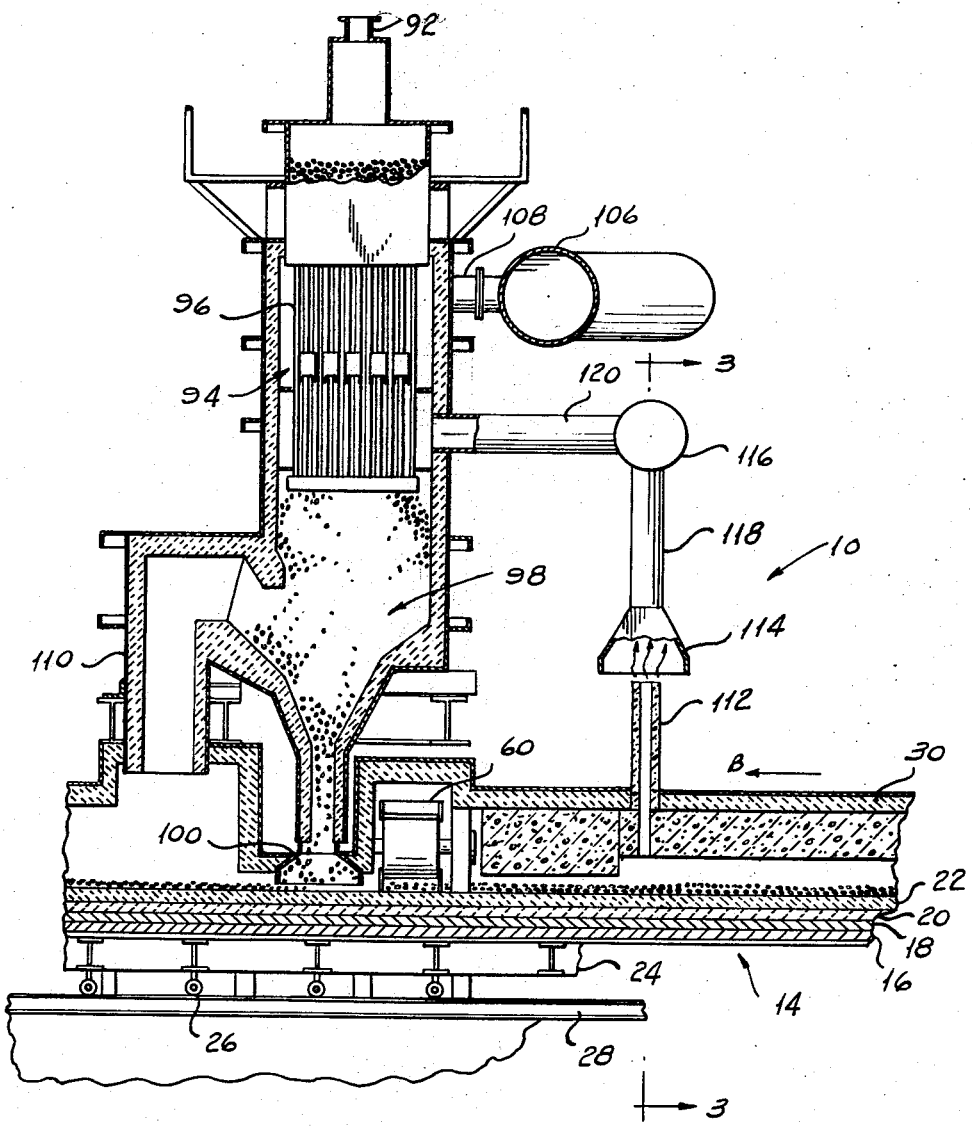
FIGURE 2 is a sectional view of my apparatus for calcining limestone.

Limestone fed to the health 14 in a manner to be described is carried through the various heating zones as the hearth moves in the direction of the arrow A in FIGURE 1, which is the same direction as is indicated by the arrow B in FIGURE 2. In the course of this movement of the hearth, the limestone breaks down into lime and exhaust gases. Ultimately, the lime is removed at a location adjacent the point at which limestone is supplied to the hearth. This removal is achieved by a conveyor 60 which scrapes the lime off the hearth 14 and delivers it to a chute 62 which directs the lime into a cooling bin 64. I use hot air drawn from the cooling bin 64 to supply preheated air to the kiln burners (not shown). A conduit 66 connects the cooling bin to a dust separator 68 wherein dust in the air drawn from the cooling bin is removed. A fan 70 driven by a motor 72 draws air from the bin 64 through the dust separator 68 and through a conduit 74 to deliver clean preheated air to ducts 78 and 80 which lead, respectively, to manifolds 82 and 84 and to mainifolds 86 and 88, all of which supply the burners.

I provide the kiln 10 with a preheating tower 90 for supplying preheated stone to the hearth 14. Tower 90 has an inlet 92 into which the crushed limestone is fed so as to pass downwardly first through an indirect heat exchange preheating zone, indicated generally by the reference character 94. In the course of passing through zone 94, the limestone falls downwardly through tubes 96 to the area around which I supply preheating air in a manner to be described to heat the stone first by indirect heat exchange.

After leaving the region 96 the stone builds up in a direct heat exchange preheating zone 98. At the lower end of the tower 90 below the indirect heat exchange zone 98, I provide a plurality of limestone distributors 100 which distribute the stone over the width of the hearth 14.

An exhaust fan 102 is connected by a conduit 104 to a manifold 106 connected by means of a plurality of pipes 108 to the interior of the tower 90 in the region of the indirect heat exchange zone 94. This system draws hot exhaust gases upwardly through conduits 110 leading to the space above the hearth immediately after the position at which the limestone is deposited on the hearth in the direction of travel of the hearth. The hot exhaust gases first are drawn through the space 98 so as to heat the stone therein by direct heat exchange and then are drawn upwardly around the tubes 96 and outwardly through pipes 108, manifold 106 and conduit 104 by means of the fan 102. The structure thus far described does not per se form part of my invention. This structure is described in detail in U.S. Patent No. 3,345,052 issued to Hubert L. Hall on Oct. 3, 1967 for "Method and Means of Calcining Limestone."

As has been explained hereinabove, as the stone is carried by the hearth 14 from the point at which it is deposited thereon by distributors 100 through the heating zone and to the discharge conveyor 60, it is heated to cause the stone to break down into lime and exhaust gases. By the time the products reach the discharge conveyor 60, the lime is at a temperature of from around 2000° F. to 2200° F. At these temperatures, the sulfur compounds break down to generate sulfur gases. I have discovered that if these gases are permitted to travel countercurrent to the direction of movement of the hearth 14, they will at some point recombine with the lime. As a result, in the prior art, the lime produced has an undesirably high sulfur content. I have discovered further that if these sulfur gases are removed at a point prior to and adjacent to the discharge station, the resultant product will have only a very low sulfur content.

I arrange a plurality of discharge conduits 112 extending through the cover 30 at a location just ahead of the discharge conveyor 60 in the direction of travel of the hearth 14. Sulfur gases drawn upwardly through the exhaust conduits 112, in a manner to be described, are collected by a hood 114 which is connected to a manifold 116 by a conduit 118. While I may employ any suitable system for exhausting the gases, preferably I provide pipes 120 which connect the manifold 116 to the interior of the tower 90 at a location which the gases can be employed to preheat the stone indirectly without deleteriously affecting the process. It will readily be apparent that, owing to the structure just described, the exhaust system including manifold 106 will cause the sulfur gases to be carried away with the rest of the exhaust gases. This exhausting of the sulfur gases must be carried out at a point in the process wherein the material is at a sufficiently high temperature to prevent the sulfur gases from recombining with the lime. That temperature is above about 2000° F.

In operation of my process, limestone is fed to the hearth by the tower 90. This stone is preheated by indirect heat exchange in the zone 94 and subsequently by direct heat exchange in the zone 98. After it has been deposited on the hearth, it is carried around through the heating zones toward the discharge conveyor 60. In the course of this movement the stone is heated to such a temperature as causes it to break down into lime and waste gases. Under the action of the exhaust system, most of the waste gases are carried upwardly through the tower first through the zone 98 wherein they heat the limestone by direct heat exchange and thence through the zone 94 wherein they heat the limestone by indirect heat exchange. The sulfur compounds in the limestone do not break down until near the end of the calcining operation when the temperature of the material is above about 2000° F. The exhaust pipes 112 are located at a position around the kiln at which the material is at a temperature above about 2000° F., at which temperature the sulfur gases will not recombine with the lime. Under the action of the exhaust system, these sulfur gases are drawn upwardly through conduit 118 in the region wherein they are formed rather than being drawn countercurrent to the direction of movement of the hearth. I have discovered that by removing the sulfur gases at this point in the process, I am able to produce lime having a very low sulfur content.

It will be seen that I have accomplished the objects of my invention. I have provided a method of and apparatus for calcining limestone which overcomes the defects of calcining systems of the prior art. I prevent sulfur gases formed in the process from being drawn through the system countercurrent to the direction of movement of the material being treated. I exhaust the sulfur gases at a point just prior to the station at which lime is removed from the hearth. I exhaust the sulfur gases at a temperature above about 2000° F. I avoid the presence of oxygen in the region whereat I exhaust the sulfur gases.

It will be understood that certain features and subcombinations are of utility and may be employed without reference to other features and subcombinations. This is contemplated by and is within the scope of my claims. It is further obvious that various changes may be made in details without departing from the spirit of my invention. It is, therefore, to be understood that my invention is not to be limited to the specific details shown and described.

Having thus described my invention, what I claim is:

1. A method of calcining limestone including the steps of introducing limestone to a rotary hearth at an intake station, heating said limestone by direct heat exchange with hot gases of combustion in an elongated zone during its passage from said intake station to a discharge station and exhausting gases released from said limestone at a location just ahead of said discharge station while preventing gases thus exhausted from coming into direct heat exchange relationship with limestone on said hearth in said zone.

2. A method as in claim 1 in which said step of heating said limestone includes gradually heating said limestone in said zone to a temperature of about 2000° F. at said discharge location.

3. A method as in claim 1 including the step of passing said exhaust gases in indirect heat exchange with limestone being fed to said hearth.

4. A method of calcining limestone including the steps of conveying limestone on a moving hearth in a kiln through an elongated zone in a direction from an intake station to a discharge station, passing hot gases of combustion along said hearth in a direction contrary to said first direction to gradually heat said imestone as it travels through said zone to a temperature of about 2000° F. adjacent said discharge station, removing exhaust gases from said kiln immediately following said limestone intake station, and removing second exhaust gases from said kiln at a location adjacent said discharge station.

5. A method as in claim 4 including the steps of feeding limestone to said hearth, driving said hearth to carry sadi limestone through said zone, first directing said first exhaust gases in direct heat exchange relationship with said limestone being fed to said hearth and then directing said first exhaust gases in indirect heat exchange with said limestone being fed to said hearth.

6. A method as in claim 4 including the steps of feeding limestone to a hearth, driving said hearth to carry said limestone through said zone, and directing said second exhaust gases in indirect heat exchange with said limestone being fed to said hearth.

7. A method as in claim 4 including the steps of feeding limestone to a hearth, driving said hearth to carry said limestone through said zone, first directing said first exhaust gases in indirect heat exchange relationship with limestone being fed to said hearth, and directing said second exhaust gases into indirect heat exchange relationship with limestone being fed to said hearth.

8. Apparatus for calcining including in combination, a hearth for conveying limestone through an elongated zone, a first station at one location in said zone at which limestone is fed to said hearth, a second station at another location in said zone remote from said first location at which lime is removed from said hearth, means for driving said hearth to carry limestone in a direction from said first station to said second station, means for gradually heating said limestone in said zone to a temperature of about 2000° F. by direct heat exchange with hot gases of combustion and exhaust means located adjacent to and ahead of said second station in the direction of travel of said hearth for removing gases released by said limestone.

9. Apparatus as in claim 8 including means for passing gases from said exhaust means in indirect heat exchange relationship with limestone being fed to said hearth at said first station.

10. Apparatus as in claim 8 including second exhaust means located adjacent to and following said first station in the direction of travel of said hearth for removing gases released by said limestone by producing a flow of gases countercurrent to the direction of travel of said hearth.

11. Apparatus as in claim 8 including second exhaust means located adjacent to and following said first station in the direction of travel of said hearth for removing said heating gases therefrom, means for passing said heating gases from said second exhaust means first in direct heat exchange with limestone being fed to said hearth and then in indirect heat exchange with limestone being fed to said hearth and means for feeding gases from said first exhaust means in direct heat exchange relationship with limestone being fed to said hearth.

References Cited

UNITED STATES PATENTS

| | | | |
|---|---|---|---|
| 2,148,052 | 2/1939 | Ahlmann | 263—28 |
| 2,672,412 | 3/1954 | Burrow et al. | 263—28 X |
| 3,050,298 | 8/1962 | Hall | 263—28 |
| 3,345,052 | 10/1967 | Hall | 263—27 |

JOHN J. CAMBY, Primary Examiner

U.S. Cl. X.R.

263—53

PO-1050
(5/69)

UNITED STATES PATENT OFFICE
CERTIFICATE OF CORRECTION

Patent No. 3499636             Dated March 10, 1970

Inventor(s) Richard T. Hall

It is certified that error appears in the above-identified patent and that said Letters Patent are hereby corrected as shown below:

Column 4, line 64, "imestone" should be limestone.

Column 4, line 73, "sadi" should be said.

Column 5, line 11, "indirect" should be direct.

SIGNED AND
SEALED
JUL 14 1970

(SEAL)
Attest:

Edward M. Fletcher, Jr.
Attesting Officer

WILLIAM E. SCHUYLER, JR.
Commissioner of Patents